Jan. 31, 1933.  O. A. JOHNSON  1,895,627
AUTOMATIC REVERSING CONTROL MECHANISM
Filed Sept. 10, 1929    4 Sheets-Sheet 2

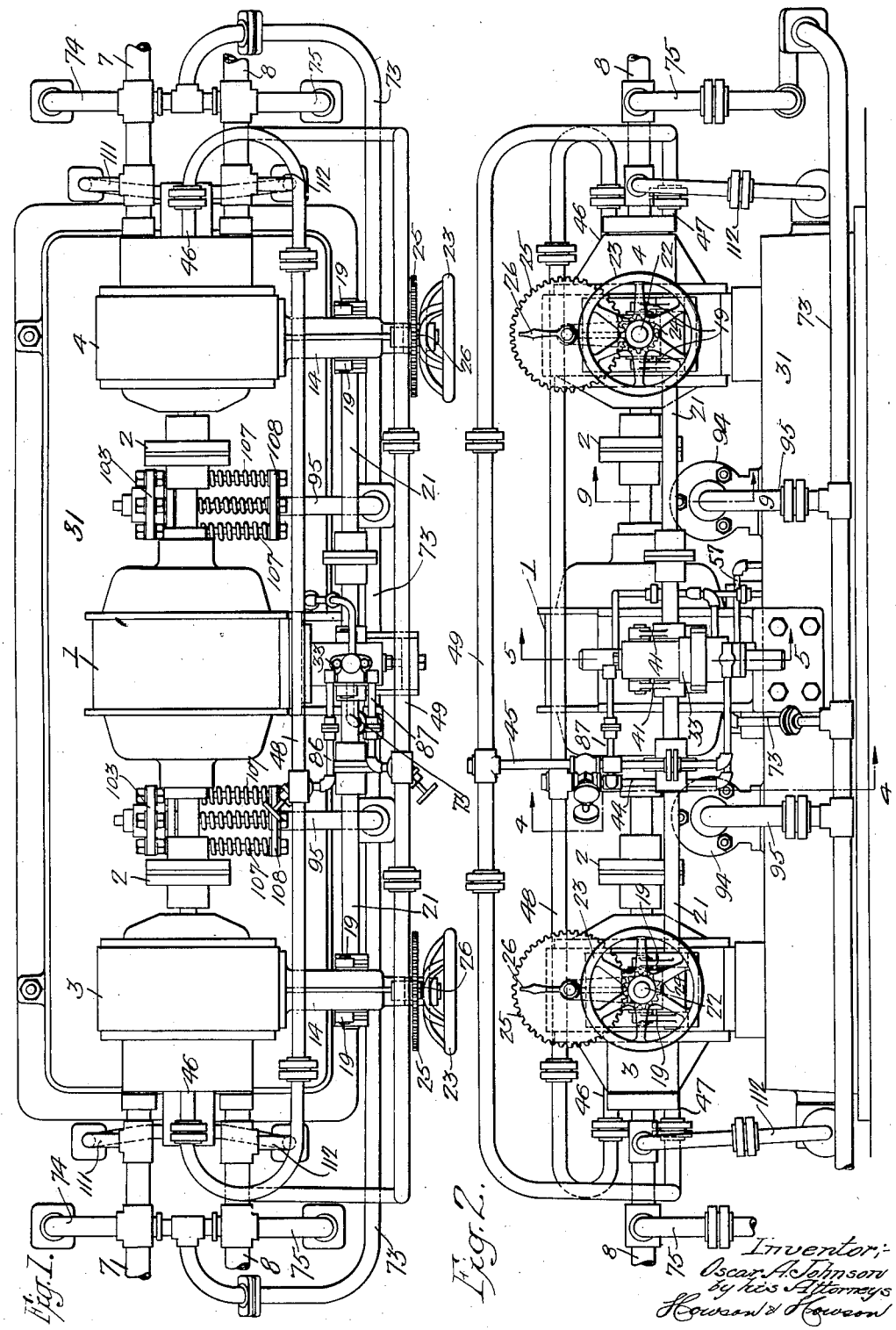

Inventor:
Oscar A. Johnson
by his Attorneys,
Howson & Howson

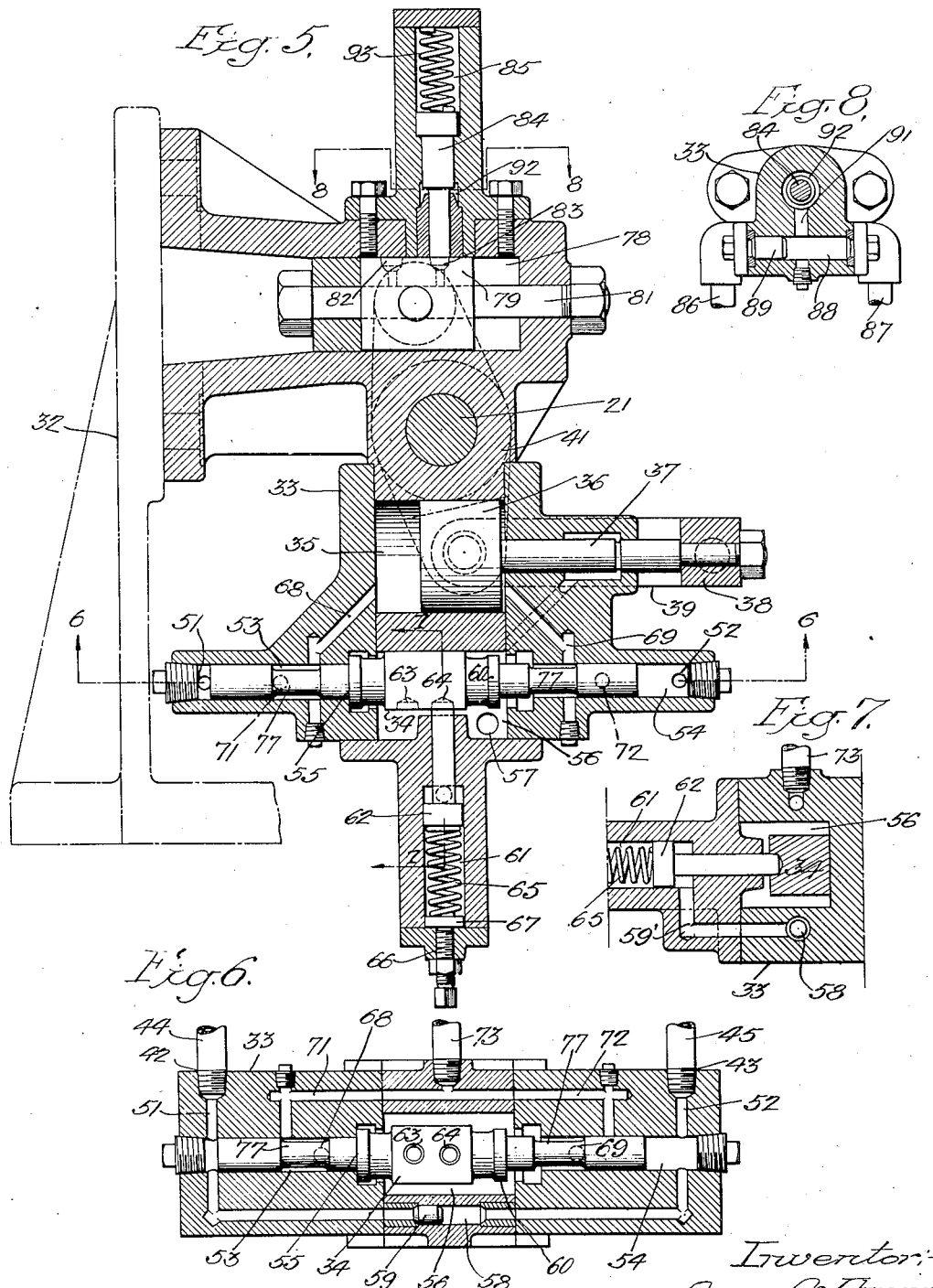

Jan. 31, 1933.   O. A. JOHNSON   1,895,627
AUTOMATIC REVERSING CONTROL MECHANISM
Filed Sept. 10, 1929   4 Sheets-Sheet 4
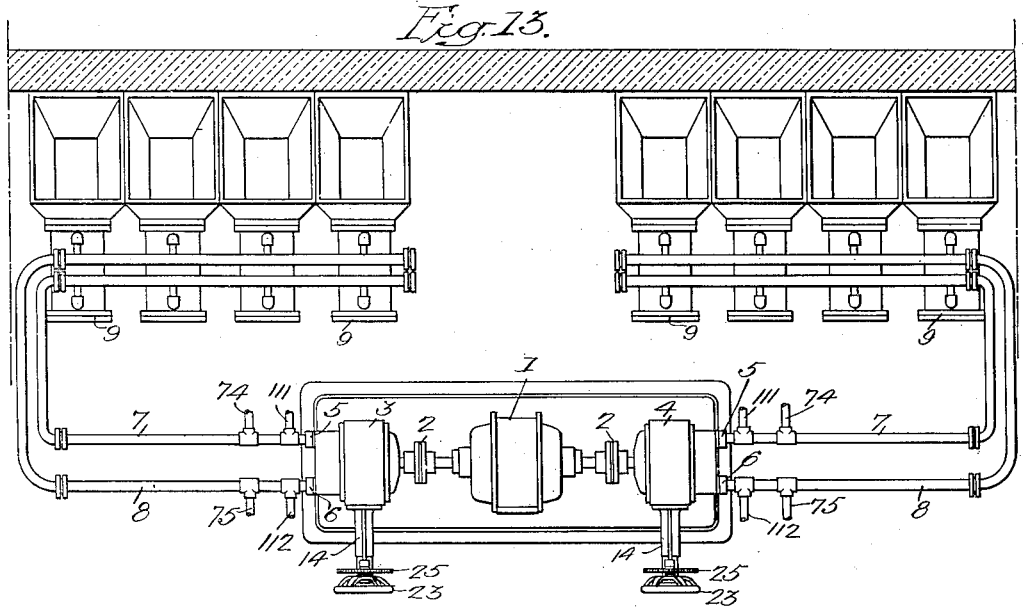
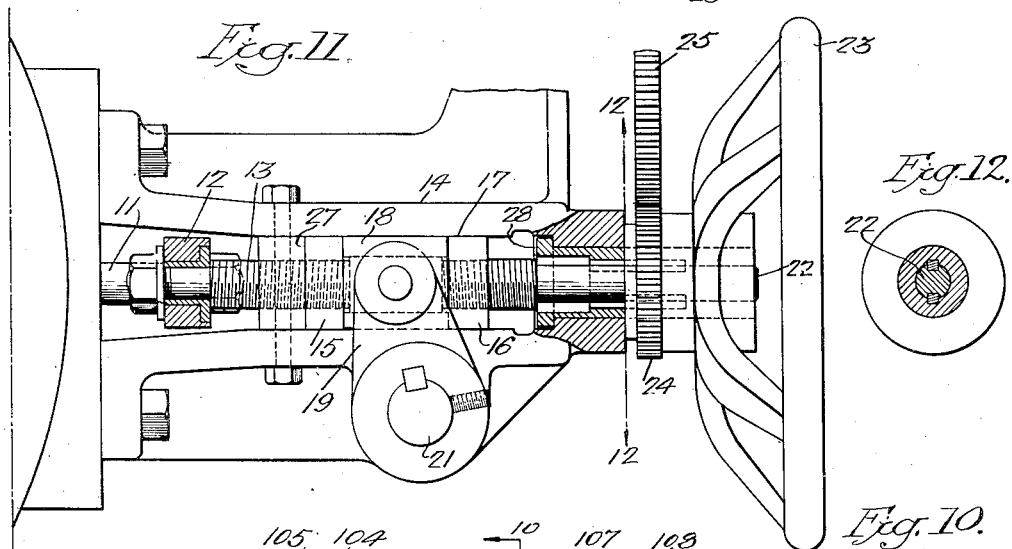
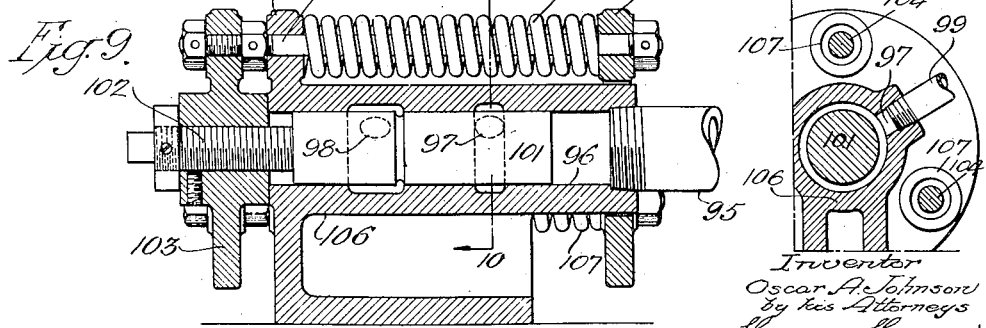
Inventor
Oscar A. Johnson
by his Attorneys
Howson & Howson Patented Jan. 31, 1933

1,895,627

UNITED STATES PATENT OFFICE

OSCAR A. JOHNSON, OF GLENSIDE, PENNSYLVANIA, ASSIGNOR TO AMERICAN ENGINEERING COMPANY, OF PHILADELPHIA, PENNSYLVANIA, A CORPORATION OF PENNSYLVANIA

AUTOMATIC REVERSING CONTROL MECHANISM

Application filed September 10, 1929. Serial No. 391,661.

This invention relates to improvements in control devices for fluid-actuated mechanisms, and the principal object of the invention is to provide novel and highly efficient means for periodically and automatically reversing a fluid-actuated member or mechanism.

More specifically, the invention contemplates the provision, in combination with a reciprocatory plunger or other actuated member having a periodic reverse movement, and a reversible fluid pump constituting the source of the actuating pressure, of a novel and improved control device for effecting automatic reversal of the fluid pump and consequent reverse movements of the actuated parts.

To this end, the invention provides a novel control device for reversible fluid pumps adapted for automatic actuation by pressures generated in the operation of said pump.

The invention further contemplates a specific application of the aforedescribed mechanism to the operation of the hydraulically-actuated rams of mechanical stokers, all as hereinafter fully set forth and illustrated in the attached drawings, in which:

Figure 1 is a plan view of a fluid pump unit made in accordance with the present invention;

Fig. 2 is a side elevation of the unit;

Fig. 5 is a section through the control valve taken on the line 5—5, Fig. 2;

Fig. 6 is a section on the line 6—6, Fig. 5, illustrating details of the control valve;

Fig. 7 is a section on the line 7—7, Fig. 5;

Fig. 8 is a section on the line 8—8, Fig. 5;

Fig. 9 is a section on the line 9—9, Fig. 2, showing details of the pressure compensating valves;

Fig. 10 is a section on the line 10—10, Fig. 9;

Fig. 11 is an enlarged fragmentary side elevational view illustrating details of the fluid pump mechanism;

Fig. 12 is a section on the line 12—12, Fig. 11, and

Fig. 13 is a diagrammatic plan view illustrating the application of the reversing mechanism to the rams of a mechanical stoker.

Figure 3:
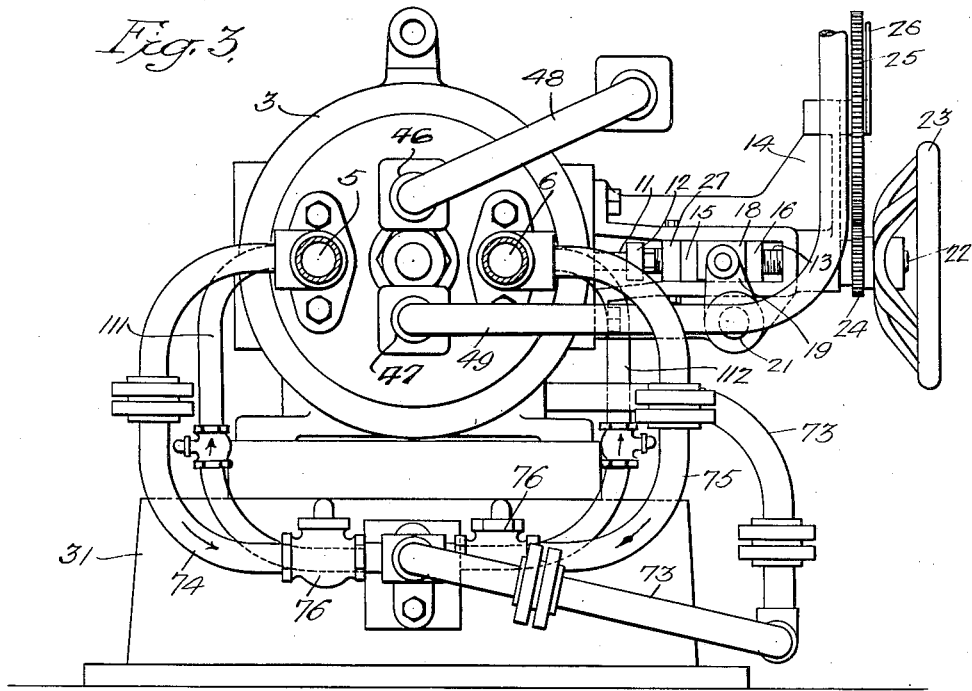
Fig. 3 is an end elevation of the unit.

With reference to the drawings, the mechanism forming the subject of the present invention may comprise an electric motor 1 directly connected through couplings 2 with hydraulic pumps 3 and 4. These pumps have provisions for reversing the discharge and preferably are of the high pressure, variable stroke and variable discharge type known in the trade as Hele-Shaw. A pump of this general character is illustrated in U. S. Patent No. 1,077,979, issued November 11, 1913.

Each of the pumps has a pair of ports 5 and 6 which constitute the main intake and discharge openings, the setting of the pump determining at any moment which of the ports functions as discharge and which as intake. By the present invention and as hereinafter described, means is provided for automatically adjusting the pump parts to periodically reverse the discharge whereby the ports 5 and 6 are individually made to alternate as intake and discharge ports. As shown in Fig. 13, these ports 5 and 6 in each instance are connected respectively through pipes 7 and 8 with a bank of cylinders 9, each cylinder containing a piston operatively connected with the ram of an automatic stoker and the connection of the pipes 7 and 8 with the cylinders 9 being such that the aforesaid reversal of fluid pressure results in a reciprocation of the pistons in the cylinders and actuation of the rams. Since the pumps 3 and 4 are identical in construction and function, the following description will be confined in large part to one only, corresponding reference characters being applied to both.

Adjustment of the pumps to reverse the direction of discharge is accomplished in each instance through the medium of longitudinally slidable rods 11, see Fig. 11, which rods are connected through a cross beam 12 with a threaded shaft 13 longitudinally movable in a bracket 14 attached to the pump housing. The shaft 13 carries two nuts 15 and 16 which are mounted for sliding movement axially of the shaft 13 in guides 17 in the bracket 14, these nuts being held in said guides against rotation. Also slidable in the guides 17 intermediate the nuts 15 and 16 is a cross head 18 operatively connected through arms 19 with a rock shaft 21 journaled in the bracket. The outer and unthreaded reduced end of the shaft 13 designated by the reference numeral 22 extends through a bearing in the outer end of the bracket 14 and has attached to its extremity a hand wheel 23 by means of which the shaft 13 may be rotated. Keyed to the shaft extension 22 inwardly of the hand wheel 23 is a gear wheel 24 which meshes with a second gear 25 with which is operatively associated an indicator arm 26, see Fig. 2, by means of which the particular setting of the pump parts may be noted. Those portions of the shaft 13 upon which the nuts 15 and 16 operate are oppositely threaded, as illustrated in Fig. 11, so that rotation of the shaft results in an opposite movement of these nuts axially of the shaft in the guides 17. The relative position of the nuts 15 and 16 determines the effective stroke of the cross head 18 with respect to the shaft 13. As illustrated in Fig. 11, the nuts 15 and 16 are adjustable to positions bearing close against the opposite sides of the cross head 18 whereby the effective stroke is a maximum one. By adjusting the nuts away from the ends of the cross head, lost motion of the cross head with respect to the shaft 13 will be afforded, thereby reducing the effective stroke. The stroke of the cross head 18 is limited in both directions by stops 27 and 28 which lie in the path of the nuts 15 and 16 respectively, and thus limit the travel of the shaft 13 axially in both directions. The shaft 21 is rocked by means hereinafter described, this rocking resulting in a reciprocation of the rods 11 to an extent predetermined by the relative positions of the nuts 15 and 16 whereby the direction of discharge of the pumps is periodically reversed and the rate of discharge varied as required.

Figure 4:
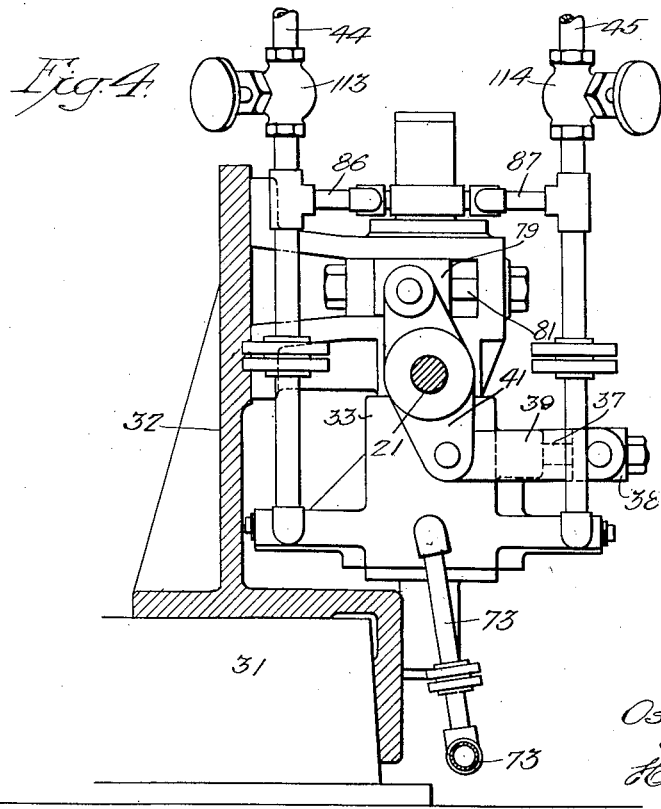
Fig. 4 is a section on the line 4—4, Fig. 2, illustrating the control valve in side elevations.

As illustrated in Figs. 1 and 2, the shaft 21 extends longitudinally substantially the full length of the unit composed of the electric motor 1 and the pumps 3 and 4, and is operatively connected as described above with both of said pumps. In accordance with the present invention, means is provided for automatically rocking the shaft 21, the reversal of movement of the shaft being effected through relatively high pressures developed by the pumps 3 and 4 when the actuated pistons of the stoker mechanism reach the respective ends of their strokes within the cylinders 9. This automatic mechanism consists primarily of a valve unit mounted in the present instance at a point intermediate the pumps 3 and 4 upon the base 31 which supports the motor 1 and the pumps 3 and 4. As illustrated in Fig. 4, the valve unit is mounted upon a bracket 32 secured to the base 31.

The details of the valve unit are best illustrated in Figs. 4 to 8, inclusive. The valve unit comprises a casing 33 in the lower portion of which is slidably mounted a reciprocatory pilot valve 34. This valve, as hereinafter described, controls passage of an actuating fluid to a cylinder 35 in which operates a piston 36 from one side of which a rod 37 projects through the side of the casing to be connected through a yoke 38 and arms 39 with a pair of levers 41, 41 secured to the shaft 21. Reciprocation of the piston 36 thus results in an oscillation or rocking of the shaft 21.

The lower portion of the casing 33 is provided with ports 42 and 43 which are connected through valved pipes 44 and 45 with supplemental ports 46 and 47 of each of the pumps 3 and 4, the pipe 44 joining a pipe 48 which extends between the two ports 46 of the respective pumps and the pipe 45 joining a pipe 49 connecting the two ports 47 of the said pumps. The ports 46 and 47 constitute supplemental pressure and suction ports for the pumps and alternate with the ports 5 and 6 for these functions as set forth above, the port 46 always corresponding in function with the port 5 and the port 47 corresponding in function with the port 6. Accordingly, the ports 42 and 43 of the valve casing 33 are alternately and periodically subjected to pressure and suction by the action of the pumps 3 and 4.

The ports 42 and 43 communicate through channels 51 and 52 with the outer end of axially aligned cylindrical bores 53 and 54, respectively, within which bores are slidably mounted the opposite extremities of the pilot valve 34. Fluid pressure applied through the pipe 45 to the port 43, while the port 42 is connected with the suction side of the pump, results in a movement of the valve 34 to a position as illustrated, in which a collar 55 on said valve bears against the inner end of the cylindrical bore 53, thereby limiting the movement of the valve to the left and also effectively sealing the inner end of the bore 53. It will be noted that in this position of the valve, the inner end of the cylinder bore 54 is in communication with an intermediate chamber 56, which chamber is in communication through a drain pipe 57 with a fluid reserve tank in the base 31 which holds a supply of actuating fluid for the pump system. In the valve position shown in the drawings, the inner end of the cylinder bore 53 is shut off from the chamber 56 by the collar 55. A reversal of the pressure and suction at the ports 42 and 43, respectively, will result in a movement of the valve 34 to the right, thereby bringing a second collar 60 on the valve into engagement with the casing at the inner end of the cylinder bore 54, closing off communication between this cylinder bore and the chamber 56 and opening the inner end of the cylinder bore 53 to the said chamber.

As illustrated in Fig. 6, the channels 51 and 52 continue beyond the cylinder bores 53 and terminate in opposite sides of a chamber 58, in which operates a shuttle valve 59 adapted in the extreme left-hand position, as illustrated, to close off the inner end of the channel 51, and in the extreme right-hand position to correspondingly shut off the channel 52. From this chamber 58 and as illustrated in Fig. 7, a channel 59' extends to the upper end of a cylindrical chamber 61 in the lower depending end of the valve casing 33. Operatively mounted in this cylinder 61 is a plunger 62 a reduced extension of which projects upwardly through the cylinder wall into the chamber 56. The upper end of this plunger is adapted to enter recesses 63 and 64 in the under side of the central portion of the valve 34 occupying the said chamber 56. When the plunger occupies the recess 64 as illustrated, the valve 34 is locked in the extreme left-hand position, and in the opening 63, the plunger functions similarly to lock the valve in the extreme right-hand position. The channel 59' enters the cylinder 61 above the plunger 62, and accordingly pressure applied through either of the ports 42 or 43 functions to force the plunger downwardly to thereby release the valve to permit shifting of the latter from one side to the other. A spring 65 is confined in the cylindrical bore 61 below the plunger 62 and tends normally to retain the plunger in the elevated or valve-locking position. Pressure applied through the channel 59' must accordingly build up to a point sufficient to overcome the spring pressure before the piston 34 is released and permitted to shift from one side of the casing to the other.

With this device, it will be apparent that fluid pressure applied through the ports 42 or 43 and acting upon one or other of the ends of the valve 34 must build up to a predetermined point before it is effective to shift the valve, the amount of pressure depending upon the tension or strength of the spring 65. Means is provided at the bottom of the cylinder 61 for regulating the pressure of the spring 65, this regulating means taking the form of a set screw 66, the inner end of which bears against a movable spring seat 67 within the cylinder, the set screw being adjustable from the outside of the casing to elevate the spring seat in the cylinder to thereby increase the tension of the spring as desired. As a result of the foregoing device, the movement of the valve 34 from one side position to the other is a relatively rapid and positive one.

The mechanism is so arranged as hereinafter set forth that movement of the valve 34 to the left results in an immediate adjustment of the pump applying pressure to the port 42 and suction to the port 43, and when the valve 34 moves in the opposite direction, the pressure and suction ports are reversed. As shown in Figs. 5 to 8, inclusive, the valve 34 has shifted to the left, thereby causing pressure to be applied to the port 42. This pressure, by reason of the fact that the plunger 62 is elevated, does not immediately effect a return movement of the valve 34 to the right. The initial pressure, however, at the port 42 and suction at the port 43 results in a movement of the valve element 59 to the right, thereby admitting pressure through the channel 59' above the plunger 62, and when this pressure has built up sufficiently to overcome the tension of the spring 65, the plunger 62 is depressed, thereby releasing the valve 34 and permitting the pressure applied through the port 42 to shift this valve to the right-hand position. As stated above, this movement of the valve 34 to the right results in an immediate reversal of the pressure and suction so that the port 42 becomes the suction port while pressure is applied at the port 43. The immediate effect of this change is to relieve the fluid pressure upon the plunger 62, permitting the spring to elevate the plunger so that the upper end thereof enters the opening 63, thereby locking the valve in the right-hand position and preventing a return movement to the left until the pressure at the port 43 becomes sufficiently high to again overcome the pressure of the spring 65. As a result of this arrangement, the movement of the valve 34 is a positive and quick one, as previously set forth, and a complete and rapid travel of the valve from one extreme position to the other is insured.

As best illustrated in Fig. 5, the cylinder bores 53 and 54 are respectively connected through channels 68 and 69 with the opposite ends respectively of the cylinder chamber 35. The bores 53 and 54 are also connected through channels 71 and 72, a pipe 73 and branch pipes 74 and 75 with the pipes 7 and 8 which extend from the pumps to the cylinders 9. Each of the pipes 74 and 75, as best shown in Fig. 3, is provided with a check valve 76 which permits flow of fluid into the pipe 73 but prevents a backflow. Since one or other of the pipes 7 and 8 is always under pressure during the normal operation of the mechanism, the fluid pressure will be continuously applied to the pipe 73.

Referring to Fig. 6, it will be noted that each end of the valve 34 operating respectively in the bores 53 and 54 is provided with an intermediate part 77 of reduced diameter and that this intermediate part is of such length as in a predetermined position to embrace the point of communication between the channels 71 and 68 and the cylinder bore 53 in the one instance and the channels 72 and 69 and the cylinder bore 54 in the other instance. When, therefore, the valve is in the extreme left-hand position as illustrated, the channel 71 is in communication with the channel 68 whereby the fluid pressure in the channel 71 is transmitted through the channel 68 to the cylinder chamber 35. In this position of the valve 34, the channels 69 and 72 are disconnected as illustrated. The portions 77 of reduced diameter, however, function also to connect the ports 68 and 69 with the chamber 56. Thus in the left-hand position of the valve as illustrated and while the channel 72 is cut off, the channel 69 through the reduced portion 77 is in communication with the chamber 56, which as previously described is connected through a drain pipe with the reservoir for the fluid actuating medium located in the present instance in the base 31. In the opposite position of the valve 34, the port 68 will be brought into communication with the chamber 56.

It will be apparent from the above that while the valve is in the position in which it is shown in Figs. 5 and 6, the left-hand end of the cylindrical chamber 35 is subjected to fluid pressure, while the other end of the chamber at the opposite side of the piston 36 is exhausted through the chamber 56. It will also be apparent that movement of the valve 34 to the right-hand position as described above will result in an application of pressure through the ducts 72 and 69 to the right-hand end of the cylindrical chamber 35 and a connection of the left-hand end of the chamber at the opposite side of the piston with the reservoir chamber, this reversal of pressures resulting in a shifting of the piston 36 to the left-hand side of the cylinder.

The movement of the piston 36 is controlled and rendered positive by means similar to that controlling the movement of the valve 34. In the upper part of the valve casing 33 is a chamber 78 in which a block 79 is slidably mounted upon a bolt 81. The top of the block 79 is provided with two openings 82 and 83 individually adapted for reception of the lower end of a plunger 84 mounted in a cylindrical chamber 85 at the top of the valve casing 33. Provision is made for admitting fluid pressure under the plunger 84 to elevate the latter to thereby release the block 79 for movement in the chamber 78, this provision taking the form in the present instance of pipes 86 and 87 branching respectively from the pipes 44 and 45 and communicating with opposite ends of a cylindrical chamber 88 in the casing in which is slidably mounted a shuttle valve 89 similar to the valve 59 previously described. A channel 91 extends from the central portion of the chamber 88 to a space 92 at the lower end of the cylinder in which the plunger 84 operates, see Figs. 5 and 8. A spring 93 confined above the plunger 84 tends to maintain the latter in the depressed or locking position, as illustrated in Fig. 5. Pressure building up in either of the pipes 86 and 87, the other pipe being connected with the suction side of the pump, results in a shifting of the shuttle 89 and admission of pressure to the space 92. When the fluid pressure overcomes the pressure of the spring 93, the plunger 84 is elevated, thereby releasing the block 79 and leaving it free to move transversely in the chamber 78.

The block 79 is connected through the levers 41 and yoke 38—39 with the piston 36, and it is obvious, therefore, that any movement of the piston from one end of its cylindrical chamber to the other cannot occur until the detent 84 is elevated from its locking position. Since the fluid pressure which actuates the piston 36 is taken from the same source as that which elevates the plunger 84, it will be apparent that the pressure must reach a magnitude determined by the tension of the spring 93 before it is effective to move the piston 36. The movement of the piston, therefore, is both positive and a relatively rapid one as required for actuation of the pump-discharge reversing mechanism. As previously set forth, the levers 41 are secured to the shaft 21 so that each movement of the piston 36 results in a change in the direction of the pump discharge.

In order to maintain a substantially uniform pressure in the pipe 73, I associate with the latter a pair of pressure control devices 94, see Figs. 1 and 2, these being connected through pipes 95 with the pipe 73. The details of the pressure control device are shown in Figs. 9 and 10. As therein illustrated, the pipe 95 enters one end of a cylindrical bore 96, which bore has in the side thereof ports 97 and 98 which are connected through pipes 99 with the reservoir constituting the source of fluid supply. These ports are normally closed by a plunger 101 slidable in the cylindrical chamber 96, one end of this plunger being connected through a threaded extension 102 with a yoke 103. This yoke has secured therein one or more bolts 104 which pass through lugs 105 on the cylinder casing 106 and which carry springs 107 one end of which engages the side of the lug 105, while the other end is confined by a spring seat element 108 on the outer end of the bolt 104. Movement of the plunger 101 as a result of fluid pressure applied through the pipe 95 is opposed by the spring or springs 107. Since the fluid pressure in the pipe 95 is continuous, the spring or springs 107 are always under compression, and act to maintain the pressure in the pipes 95 and 73 constant. If the pressure in the pipe 95 increases beyond a predetermined point, the piston uncovers first the port 97 and later the port 98 whereby the fluid pressure in the pipe 73 is relieved, the fluid passing back to the reservoir. Pulsations in the pump pressure are relieved by these devices to a large extent.

These devices also function to assist in the movement of the pump parts past a theoretical dead center in the discharge reversing operation. As the pressure in the system approaches that required for retraction of the detents 62 and 84 and subsequent operation of the valve 34 and piston 36, the springs 107 are compressed, the movement of the plunger 101, however, being insufficient under normal conditions to uncover the port 97, energy being thus stored up in the springs. Upon retraction of the detents 62 and 84, the piston 36 is shifted from one end of its cylinder toward the other, resulting in a corresponding movement of the pump discharge reverse gear. When the piston 36 reaches a mid position in its cylinder, the pump elements are in the dead center or neutral position in which no pumping action takes place to produce pressure in the system. The springs 107 and the plunger 101 to which said springs are connected now take up the function of the pump in providing fluid pressure in the system and maintain sufficient pressure to insure a continued movement of the piston 36 to the end of the cylinder and a completion of the pump-reversing operation. The devices 94, therefore, function not only as safety valves and regulating means for the system pressure, but also constitute in effect pressure-accumulating means operative to maintain pressure in the system sufficient to insure a positive movement of the pump parts past the neutral or dead center positions in the discharge-reversing operations.

The fluid reservoir, formed in the base 31, is connected with the pipes 7 and 8 through pipes 111 and 112, a suitable check valve or valves permitting withdrawal of the fluid through these pipes, but preventing a reverse flow. By this means is replaced in the system the fluid discharged to the reservoir from the chambers 56 or 96, as well as fluid lost through leakage.

The operation of the mechanism will be apparent from the foregoing description. Reversal of the pump discharge as described results in a reciprocation of the pistons in the cylinders 9. At each end of the stroke the continued action of the pump builds up pressure in one of the pipes 7 or 8, as the case may be, and when this pressure becomes sufficiently great to overcome the pressure of the spring 65, there occurs an automatic actuation of the valve unit 33—93 as described, which results in a reversal of the discharge of the pump, the cycle thereupon being repeated. By controlling the rate of discharge of the pumps through the hand wheels 23 and stop nuts 17 and 27, the time between strokes of the ram pistons may be regulated as required. The device is capable of modification without departure from the invention.

I claim:

1. The combination with a working cylinder and a piston reciprocatory therein, a source of fluid pressure, ducts connecting said source with the opposite ends of said cylinder, a valve controlling the passage of fluid in said ducts, fluid pressure means for actuating the valve, and means for preventing actuation of said valve to admit fluid to either end of said cylinder until said pressure has reached a predetermined maximum, said preventing means including a fluid pressure retracted detent operatively associated with the valve, means for operatively connecting said detent to the said source of fluid pressure whereby the latter is effective to retract the detent from the valve-locking position, and a spring normally retaining the detent in the advanced position.

2. The combination with a working cylinder, of a piston reciprocatory in said cylinder, a source of fluid pressure, ducts connecting said source with the opposite ends of said cylinder, and means for reversing the direction of flow of fluid in the ducts to thereby actuate the piston, a pressure-actuated valve operatively connected with the said source of pressure and controlling the flow of fluid in said ducts, a detent operatively associated with the valve, ducts operatively connecting said detent with the source of fluid pressure, and an automatically actuated valve in said latter duct for controlling the operation of said detent.

3. The combination with a reversible fluid motor, of a source of fluid pressure connected with the motor, a valve operatively connected with said source and controlling the connection between the said source and the motor, a detent for maintaining the valve locked in predetermined positions, a second detent for locking the motor parts in predetermined positions, and means operative under predetermined pressures at the said source for retracting said detents to permit the said fluid pressure to actuate both the valve and the motor.

4. The combination with a working cylinder and a piston reciprocatory therein, of a source of fluid pressure, and ducts connecting said source with the opposite ends of said cylinder, a detent adapted to lock the said piston at the respective ends of the stroke within the cylinder, and means operatively associated with the said source of pressure for retracting the detent to release the piston when the piston-actuating pressures generated at the said source reach a predetermined maximum.

5. A control unit for reversible discharge fluid pumps comprising a casing having therein a working cylinder, a piston reciprocatory in said cylinder, fluid pressure ducts extending to the opposite ends of said cylinder, a reciprocatory valve element for controlling said ducts, means for connecting said ducts with the said pump for actuating the piston, means for operatively connecting the said valve with the pump for actuating the valve, detents adapted to lock both the valve and piston in predetermined positions against the actuating pressures, and pressure-actuated means for retracting said detents when the actuated pressures generated by the pump reach a predetermined maximum.

6. A control unit for reversible discharge fluid pumps comprising a casing having therein a working cylinder, a piston reciprocatory in said cylinder, fluid pressure ducts extending to the opposite ends of said cylinder, a reciprocatory valve element for controlling said ducts, means for connecting said ducts with the said pump for actuating the piston, means for operatively connecting the said valve with the pump for actuating the valve, detents adapted to lock both the valve and piston in predetermined positions against the actuating pressures, pressure-actuated means for retracting said detents when the actuated pressures generated by the pump reach a predetermined maximum, and means connecting said piston with the reversing mechanism of said pump whereby the movement of said piston results in periodic reversal of the pump discharge.

7. A fluid system comprising a reversible discharge pump, discharge-reversing means including a reversible motor adapted for operation by fluid pressure in the system, means including a control valve for operatively connecting the motor with the system, means releasable by said fluid pressure for retaining the motor inoperative until said pressure reaches a predetermined maximum, and means for maintaining a predetermined motor-actuating pressure in the system during the discharge-reversing operation.

8. The combination with a reversible discharge pump, of a fluid system fed by said pump, means actuated by a predetermined pressure in said system for reversing the pump discharge, means releasable by a pressure in the system in excess of that required for actuation of said reversing means for retaining the latter inoperative, and means actuated by said excess pressure to sustain the operating pressure on the reversing means.

9. The combination with a reversible discharge pump, of a fluid system fed by said pump, means actuated by a predetermined pressure in said system for reversing the pump discharge, a cylinder communicating with the system and having a port, a plunger in said cylinder normally closing said port and adapted to be moved by excess pressure in the system to a position uncovering said port, and a spring resiliently opposing said movement and normally retained in a partially flexed condition by the system pressure whereby said spring is operative to sustain said reverse-actuating pressure during the reversing operation.

10. The combination with a working cylinder, of a piston reciprocatory in said cylinder, a source of fluid pressure, ducts connecting said source with the opposite ends of said cylinder, means for reversing the direction of flow of fluid in the ducts to thereby actuate the piston, a pressure actuated valve operatively connected with said source of pressure and controlling the flow of fluid in said ducts, means for locking said valve in predetermined positions, and means for releasing said locking means when the pressure at said source reaches a predetermined maximum.

11. The combination with a reversible motor, of a source of fluid pressure connected with the motor, a valve operatively connected with said source and controlling the connection between said source and the motor, means for locking said valve in predetermined positions, means for locking said motor in predetermined positions, and means operated under predetermined pressures at said source for releasing both of said locking means to permit said fluid pressure to actuate both the valve and the motor.

12. The combination with a working cylinder and a piston reciprocatory therein, of a source of fluid pressure, ducts connecting said source with the opposite ends of said cylinder, means adapted to lock said piston at the respective ends of the stroke within the cylinder, and means operatively associated with the said source of pressure for releasing said locking means when the piston-actuating pressure generated at said source reaches a predetermined maximum.

OSCAR A. JOHNSON.